United States Patent [19]
Cromer et al.

[11] Patent Number: 6,139,018
[45] Date of Patent: Oct. 31, 2000

[54] POSITIVE PRESSURE-ACTUATED BRUSH SEAL

[75] Inventors: Robert Harold Cromer, Johnstown; Norman Arnold Turnquist, Cobleskill; Christopher Edward Wolfe; Bharat S. Bagepalli, both of Niskayuna, all of N.Y.

[73] Assignee: General Electric Co., Schenectady, N.Y.

[21] Appl. No.: 09/047,617

[22] Filed: Mar. 25, 1998

[51] Int. Cl.[7] ................................................ F16J 15/32
[52] U.S. Cl. ........................ 277/355; 277/301; 277/303
[58] Field of Search .................................... 277/355, 301, 277/303

[56] References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl . |
| 4,785,623 | 11/1988 | Reynolds . |
| 4,809,990 | 3/1989 | Merz . |

(List continued on next page.)

FOREIGN PATENT DOCUMENTS

| | | |
|---|---|---|
| 376071 | 7/1990 | European Pat. Off. . |
| 0453315 A1 | 10/1991 | European Pat. Off. . |
| 778431 | 6/1997 | European Pat. Off. . |
| 2938-484 | 3/1981 | Germany . |
| 421302 | 5/1947 | Italy . |
| 3-209068 | 9/1991 | Japan . |
| 2 191 825 | 12/1987 | United Kingdom . |
| 2258277 | 2/1993 | United Kingdom . |
| 2258277A | 2/1993 | United Kingdom ................... 277/355 |
| 2 301 635 | 12/1996 | United Kingdom . |
| WO92/05378 | 4/1992 | WIPO . |

OTHER PUBLICATIONS

"Positive Pressure Variable Clearance Packing," Morrison et al.,; GE Turbine Reference Library, May 1990.

*Primary Examiner*—Anthony Knight
*Assistant Examiner*—Mark Williams
*Attorney, Agent, or Firm*—Nixon & Vanderhye

[57] ABSTRACT

A brush seal includes a plurality of bristles in a circumferential array secured to a fixed component and about a rotary component. The bristles are cantilevered toward the rotary component at an angle to the radii of the rotary component with the bristle tips engaged against the rotary component. The bristles are supported by plates on opposite axial sides of the bristles. The plates have channels for directing fluid under pressure into the channels and against the bristles to deflect or bend the bristles toward the rotary component so that the tips of the bristles bear against the surface of the rotary component, enhancing the seal.

9 Claims, 3 Drawing Sheets

U.S. PATENT DOCUMENTS

| | | |
|---|---|---|
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,496,045 | 3/1996 | Millener et al. .......................... 277/355 |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |
| 5,630,590 | 5/1997 | Bouchard et al. . |
| 5,961,280 | 10/1999 | Turnquist et al. ....................... 277/355 |

POSITIVE PRESSURE-ACTUATED BRUSH SEAL

TECHNICAL FIELD

The present invention relates to brush seals for rotary machines such as steam and gas turbines and particularly relates to a pressure-actuated brush seal for use with rotary machines.

BACKGROUND

Rotary machines such as steam and gas turbines used for power generation in mechanical drive applications are generally large machines consisting of multiple turbine stages. In turbines, high pressure fluid flowing through the turbine stages must pass through a series of stationary and rotating components and seals between the stationary and rotating components are used to control leakage. The efficiency of the turbine is directly dependent upon the ability of the seals to prevent is leakage, e.g., between the rotor and stator. Labyrinth-type seals are typically utilized in these designs. A labyrinth seal conventionally comprises a plurality of axially spaced seal teeth terminating in a tapered tip adjacent the rotary component, providing a tortuous path and, hence, an effective seal between high and low pressure regions on opposite axial sides of the seal. While labyrinth seals have proved to be quite reliable, their performance degrades over time as a result of transient events in which the stationary and rotating components interfere, rubbing the labyrinth teeth into a mushroom profile and opening the seal clearance.

Another type of seal used in many environments, including rotary machines, is a brush seal. Brush seals are generally less prone to leakage than labyrinth seals. The brush seal can also accommodate relative radial movement between fixed and rotational components, for example, between a rotor and a stator, because of the flexure of the seal bristles. Brush seals also generally conform better to surface non-uniformities. The result of using brush seals is better sustained rotary machine performance than is generally possible with labyrinth seals alone.

Combination labyrinth/brush seals have also been proposed. In these seals, a brush seal, i.e., a circumferentially extending array of elongated bristles, is disposed in combination with a labyrinth seal, either instead of one of the labyrinth teeth or in addition to the labyrinth teeth. The combination latyrinth/brush seal not only affords an effective seal but also provides a back-up seal should one of the different types of seals fails. It will be appreciated that while brush seals typically contact the rotary member, wear-in and rotary excursions sometimes open a clearance between the tips of the bristles and the rotary component, hence diminishing the effectiveness of the seal.

DISCLOSURE OF THE INVENTION

According to the present invention, there is provided a brush seal in which the bristles are positively deflected by fluid flow in a direction toward the rotary component to ensure engagement against the component. That is, a positive flow of fluid under pressure is directed against the bristles to deflect the bristles in a direction toward the rotary component to ensure contact and, hence, an effective seal between the stationary and rotary components. The brush seal can be used by itself or in combination with a labyrinth-type seal.

More particularly, the present invention provides a brush seal having a circumferential array off elongated bristles extending at an angle offset from radii of the rotary component and one or more seal plates on opposite sides of the brush seal having flow channels for directing fluid under pressure against the bristles, tending to deflect the bristles toward the rotary component. Particularly, the channels are radially offset from radii of the rotary component in a direction opposite to the direction of the radii offset of the bristles from the radii of the rotary component. By spacing the channels circumferentially from one another about the brush seal, the flow of fluid under pressure tends to deflect or bend the bristles toward the rotary component. The fluid udder pressure may be supplied from an external source or may be provided from the high pressure region on one side of the seal.

To enhance the ability of the fluid under pressure to deflect the bristles, the present invention provides a plurality of circumferentially spaced foils within the circumferential array of elongated bristles. It will be appreciated that the bristles extend side-by-side in both axial and circumferential directions. The plane of the foils extends in the same cant angle of the bristles arid extends preferably for the same axial extent of the side-by-side arrangement of the bristles. Consequently, the fluid under pressure flows riot only against the bristles but against the foils, which provide a sufficient surface area to be responsive to the fluid flow to engage the bristles, tending to displace them toward the rotary component.

In a preferred embodiment according to the present invention, there is provided a brush seal for sealing between stationary and movable components, comprising an array of elongated bristles forming a brush seal for sealing between the stationary and moving components and a flow channel fir flowing a fluid under pressure in a direction to deflect the bristles toward one of the components.

In a further preferred embodiment according to the present invention, there is provided a brush seal comprising a rotary component rotatable about an axis and a stationary component about the axis, an array of elongated bristles carried by the stationary component and extending toward the rotary component at an angle offset from radii of the rotary component in a direction of rotation of the rotary component and a guide carried by the stationary component for flowing fluid under pressure against the bristles in a direction to deflect the bristles toward the rotary component.

In a still further preferred embodiment according to the present invention, there is provided a method of forming a seal between a rotary component rotatable about an axis and a stationary component about the axis wherein the stationary component has an array of elongated bristles extending toward the rotary component at an angle offset from radii of the rotary component and in a direction of rotation of the rotary component, comprising the step of positively flowing a fluid under pressure against the bristles to deflect the bristles toward the rotary component to form a seal between the rotary and stationary components.

Accordingly, it is a primary object of the present invention to provide a novel and improved pressure-actuated brush seal far sealing between rotary and stationary components wherein the array of brush seal bristles are positively deflected or bent toward the rotary component by supplied fluid pressure to afford an enhanced seal.

BEST MODE FOR CARRYING OUT THE INVENTION

Figure 1:
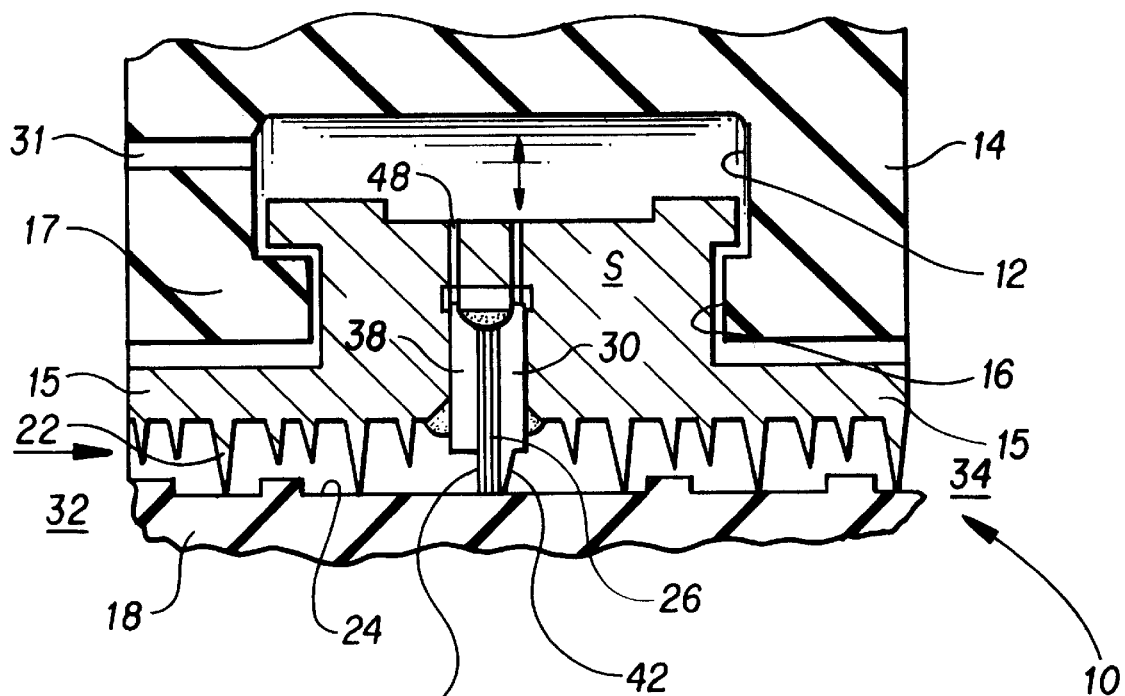
FIG. 1 is a fragmentary cross-sectional view of a combination labyrinth/brush seal in a packing ring segment of a stationary component of a turbine sealing against a rotor.

Referring now to the drawings, particularly to FIG. 1, there is illustrated a combination labyrinth/brush seal for use in sealing between stationary and rotary components of a rotary machine such as a turbine. As illustrated, the combination labyrinth/brush seal, generally designated 10, is disposed in a dovetail groove 12 of a stationary component 14 of a rotary machine. The labyrinth/brush seal 10 forms part of a packing ring segment S having a complementary shape for disposition in the groove 12 with sealing flanges 15 extending axially beyond the neck opening 16 of the groove 12, the neck being defined by hook flanges 17. It will be appreciated that the groove 12 extends circumferentially about the stationary component 14 and that the stationary component 14 extends about a rotary component, for example, a shaft 18 rotatable about an axis. Each packing ring segment S of the plurality thereof about the shaft 18 includes a plurality of generally radially inwardly extending tapered teeth 22 for disposition in close proximity to, but spaced from, lands 24 on the rotary shaft for forming a labyrinth seal between the stationary packing ring segments S and the rotor 18.

In each packing ring segment S, there is also provided a brush seal 25 comprising a circumferentially extending array of bristles 26 extending between a pair of upstream and downstream guide plates 28 and 30, respectively. The tips of the brush seal bristles 26 engage the surface of the rotor 18, forming a brush seal therewith. The brush seal 25 is provided in a groove which extends circumferentially about each packing ring segment. It will be appreciated that the bristles may be secured in the brush seal along the top portion of the groove in which the brush seal resides, may be welded to an overlying band forming part of the brush seal and also received in the groove, or welded at common ends thereof to one another distal of the bristles tips such that the bristles are cantilevered from their radially outermost ends.

In a particular form of combined labyrinth/brush seal, the packing ring segment is movable radially inwardly toward the rotor and radially outwardly away from the rotor. For example, the packing ring segment may be provided with springs, not shown, located between the axially opposite flanges of the packing ring segment S and the hook flanges 17 of the groove 12, biasing the packing ring segment for movement radially outwardly. Fluid under pressure may be introduced into the groove 12 via a passageway 31 for displacing the packing ring segment radially inwardly, for example, during steady state operating conditions such that the bristle tips engage the rotor surface whereby the combined labyrinth/brush seal is effective to seal between high and low pressure regions 32 and 34, respectively, at opposite axial sides of the seal.

Figure 2:
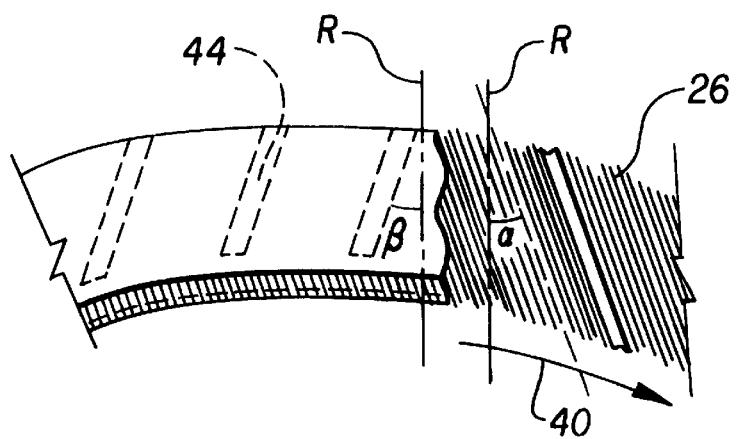
FIG. 2 is a side elevational view of the brush seal segment with portions broken out to illustrate various component parts thereof.
Figure 3:
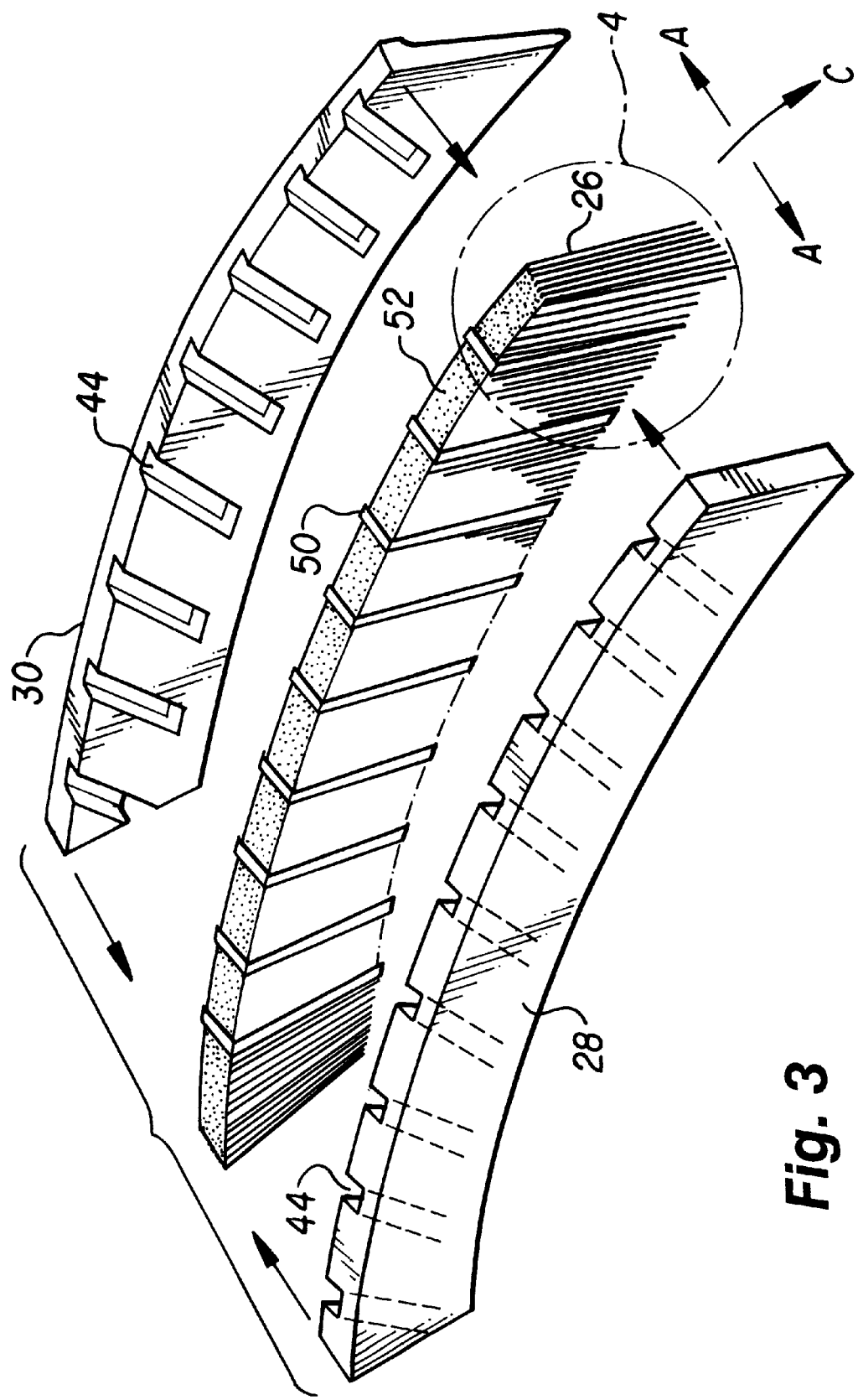
FIG. 3 is a fragmentary perspective view of the brush seal illustrated in FIG. 2.
Figure 4:
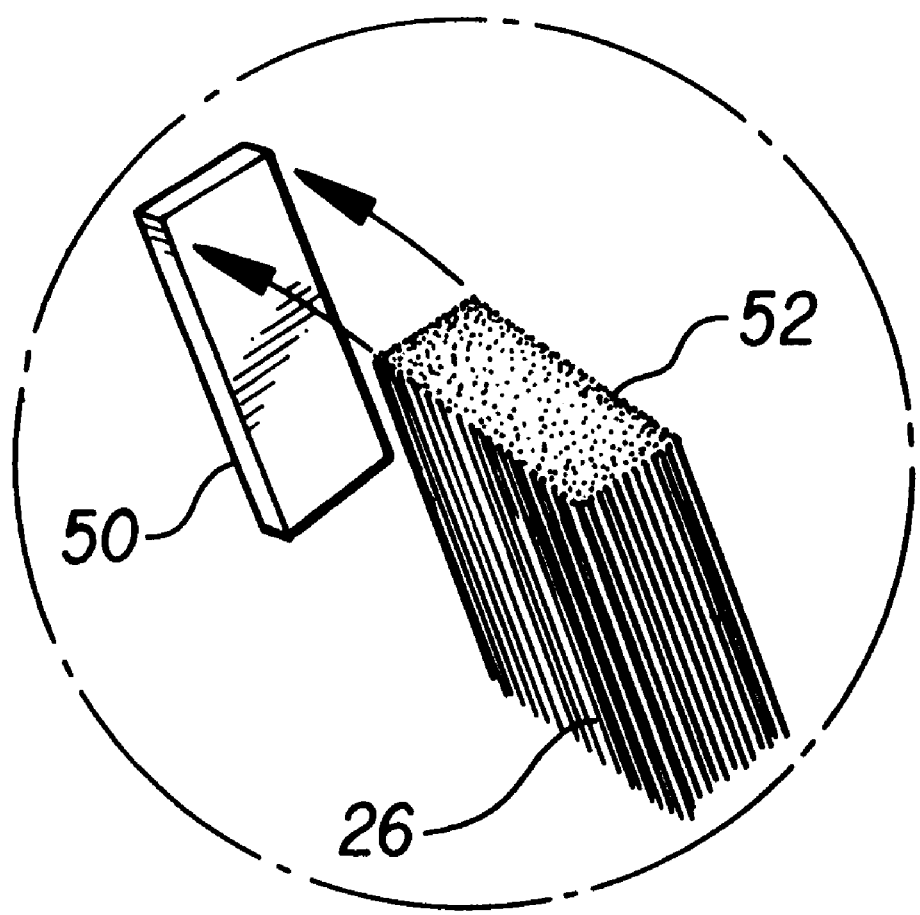
FIG. 4 is a perspective view of a combination of bristles and a foil used in the brush seal hereof.

Referring now to FIG. 2, the brush seal bristles 26 are disposed in a circumferential array thereof, with the bristles lying side-by-side in both circumferential and axial directions C and A, respectively, as indicated by the arrows. That is, as best illustrated in FIGS. 3 and 4, the plurality of bristles lie side-by-side and, consequently, a plurality of such bristles lying side-by-side extend both axially and circumferentially, thereby providing a tortuous path between the bristles for fluid flow between high and low pressure regions of the seal. As illustrated in FIG. 2, the bristles are disposed at a cant angle a with respect to radii R of the rotary component. That is, at each circumferential location where the rotary component has a radius R, the bristles extend at an angle a offset from the radii R of the rotary component and in the direction of rotation of the rotary component as indicated by the arrow 40 in FIG. 2. The bristles 26 preferably lie between the pair of guide plates 28 and 30, although it will be appreciated that only one such guide plate is necessary, and is on the downstream side of the bristles. Each of the guide plates is disposed in the groove of the packing ring segment and extends radially inwardly to terminate short of the rotor 18. On the upstream side, the guide plate 28 extends well short of the rotor surface, while the downstream backing or guide plate 30 forms a radially inwardly directed tapered tooth 42 similar to the tapered teeth 22 of the labyrinth seal. Thus, the tooth 42 not only forms a backing plate on the low pressure side of the bristles but also forms part of the labyrinth seal.

As illustrated in FIG. 3, one or both of the plates 28 and 30 are provided with a plurality of fluid flow channels 44. The channels 44 open against the bristles 26 and terminate at their radial inner ends short of the radial innermost edges of the guide plates. At each circumferential location thereof, each channel 44 extends along the inside faces of the backing plates 28 and 30 at an angle $\beta$ relative to a radius R at that location and which channel 44 extends in an opposite direction to the direction of rotation of the rotor 18. That is, the bristle angle $\alpha$ and the channel angle $\beta$ lie on opposite sides of the radius at each circumferential location. A fluid under pressure is supplied to each of the channels 44. For example, as illustrated in FIG. 1, each of the channels 44 may have a through-passage 48 communicating fluid under pressure in groove 12 into the channel 44. Consequently, fluid under pressure flows through the passages 48 into the channels 44 and against the bristles disposed between the backing plates 28 and 30. By flowing fluid under pressure through the channels 44 and onto the bristles 26, the fluid tends to deflect or bend the bristles in a direction toward the rotary component. That is, the fluid under pressure deflects the bristles such that the tips of the bristles bear more heavily against the surface of the rotor 18 to maintain the seal thereagainst.

Referring to FIGS. 3 and 4 and to facilitate the bending or deflection of the cantilevered bristles, a plurality of foils or "sails" are interspersed among the bristles 26 in the circumferential array thereof. Thus, the foils 50, as best illustrated in FIG. 3, are positioned between groups of bristles 52 at circumferentially spaced locations about the circumferentially extending array of bristles 26 and are secured therein similarly as the bristles are secured. The foils 50 extend between the interior surfaces of the guide plates 28 and 30 and hence extend the full axial extent of bristles 26. The foils 50 also lie at the same angle $\alpha$ as does the bristles 26. Alternatively, the foils can be cut shorter than the bristles so as not to affect rotor wear or contact dynamics. The bristles are formed of a flexible material. Consequently, when a fluid passes along the channels 44 into the array of bristles, the fluid under pressure acts against the cantilevered foils, tending to flex the radially inner portions of the foils toward the rotor 18 and in a direction opposite the direction of rotation of the rotor. This causes the bristles to deflector bend toward the rotor and the bristle tips to bear along the rotor surface.

It has been observed that brush seals sealing between high and low pressure regions in a fluid system have a natural tendency to blow down toward the rotary component against which the bristles seal as a result of fluid flow between the high and low pressure regions. The present system, therefore, augments any such observed tendency.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal comprising:

a rotary component rotatable about an axis and a stationary component about said axis;

an array of elongated bristles carried by said stationary component and extending toward said rotary component at an angle offset from radii of said rotary component in a direction of rotation of the rotary component; and a guide plate carried by said stationary component on one axial side of said bristles and having a plurality of channels spaced circumferentially from one another, said channels extending at an angle offset from radii of said rotary component and in a direction opposite to the direction of rotation of said rotary component for flowing a fluid under pressure against said bristles in a direction to deflect the bristles toward said rotary component.

2. A brush seal according to claim 1 including a second guide plate on an opposite axial side of said bristles from the first mentioned guide plate, said second guide plate having a plurality of channels spaced circumferentially one from the other, said channels of said second guide plate extending at an angle offset from radii of said rotary component and in a direction opposite to the direction of rotation of said rotary component for flowing fluid under pressure against said bristles to deflect the bristles toward said rotary component.

3. A brush seal according to claim 1 wherein the channels are open to the bristles along sides thereof in registration with the array of bristles.

4. A method of forming a seal between a rotary component rotatable about an axis and a stationary component about said axis wherein the stationary component has an array of elongated bristles extending toward said rotary component at an angle offset from radii of said rotary component and in a direction of rotation of the rotary component, comprising the step of positively flowing a fluid under pressure through a plurality of circumferentially spaced flow channels lying on one axial side of said bristles and against said bristles to deflect the bristles toward said rotary component to form a seal between said rotary and stationary components.

5. A method according to claim 4 including flowing the fluid under pressure in a direction opposite to the direction of rotation of said rotary component.

6. A method according to claim 4 including flowing the fluid in a direction generally in a plane extending normal to said axis.

7. A method according to claim 4 wherein said seal lies between high and low pressure regions on opposite axial sides thereof with fluid passing through the bristles from the high pressure region to the low pressure region tending to bend the bristles downwardly toward the rotary component and including the step of augmenting the lie of the bristles by said step of positively flowing the fluid against the bristles to deflect the bristles toward said rotary component.

8. A brush seal comprising:

a rotary component rotatable about an axis and a stationary component about said axis;

an array of elongated bristles carried by said stationary component and extending toward said rotary component at an angle offset from radii of said rotary component in a direction of rotation of the rotary component;

a guide carried by said stationary component for flowing fluid under pressure against said bristles in a direction to deflect the bristles toward said rotary component;

said bristles extending side-by-side in both axial and circumferential directions about said axis, and a plurality of elements disposed in said array of bristles at circumferentially spaced positions thereabout and having an axial extent, said elements extending toward said rotary component substantially at the same offset angle as said bristles extend relative to said radii, said elements being movable in a circumferential direction in response to fluid flow thereagainst to deflect the bristles toward said rotary component.

9. A brush seal comprising:

a rotary component rotatable about an axis and a stationary component about said axis;

an array of elongated bristles carried by said stationary component and extending toward said rotary component at an angle offset from radii of said rotary component in a direction of rotation of the rotary component;

a guide carried by said stationary component for flowing fluid under pressure against said bristles in a direction to deflect the bristles toward said rotary component;

a plurality of guides on opposite axial sides of said bristles, each of said guides having a plurality of channels spaced circumferentially one from the other, said channels extending at an angle offset from radii of said rotary component and in a direction opposite to the direction of rotation of said rotary component for flowing fluid under pressure against said bristles to deflect the bristles toward said rotary component;

said bristles extending side-by-side in both axial and circumferential directions about said axis, and a plurality of elements disposed in said array of bristles at circumferentially spaced positions thereabout and having an axial extent, said elements extending toward said rotary component substantially at the same offset angle as said bristles extend relative to said radii, said elements being movable in a circumferential direction in response to fluid flow thereagainst to deflect the bristles toward said rotary component.

* * * * *